United States Patent [19]

Rix

[11] 4,261,821
[45] Apr. 14, 1981

[54] APPARATUS FOR TREATING WATER WITH A CHEMICAL

[76] Inventor: Larry E. Rix, R.R. No. 2, Box 341, Marion, Ill. 62959

[21] Appl. No.: 158,872

[22] Filed: Jun. 12, 1980

[51] Int. Cl.$^3$ .............................................. C02B 1/18
[52] U.S. Cl. ................................. 210/101; 210/205; 210/241
[58] Field of Search .............. 210/101, 205, 206, 241, 210/250; 137/98–100, 101.11, 110

[56] References Cited

U.S. PATENT DOCUMENTS

| | | | |
|---|---|---|---|
| 703,596 | 7/1902 | Kennicott | 210/101 X |
| 912,803 | 2/1909 | Bruce | 210/101 X |
| 2,184,346 | 12/1939 | Hinsch | 137/99 |
| 2,626,728 | 1/1953 | Harper | 210/101 X |

Primary Examiner—John Adee
Attorney, Agent, or Firm—L. S. Van Landingham, Jr.

[57] ABSTRACT

Improved apparatus is disclosed for treating waste water with a chemical. The apparatus is self-contained and may be moved from site to site for use on a permanent, semi-permanent or temporary basis as needed. It is strong, durable and light weight in construction, operates automatically or semi-automatically, and does not require a full-time operator. An outside power supply is not needed as the apparatus is powered by the water being treated. The apparatus is especially useful in treating acidic mine water with a chemical having a basic reaction before it is discharged into a stream or sewer, but other types of waste water may be treated.

1 Claim, 14 Drawing Figures

APPARATUS FOR TREATING WATER WITH A CHEMICAL

THE BACKGROUND OF THE INVENTION

1. The Field of the Invention

The present invention broadly relates to apparatus for treating water. In one of its more specific embodiments, the invention is concerned with an improved apparatus for treating waste water with a chemical. The apparatus is especially useful in treating acidic mine water with a chemical having a basic reaction to thereby neutralize or partially neutralize the same before discharge into a stream or sewer.

2. The Prior Art

Acid mine water, aqueous industrial acid wastes and other acidic waste water streams constitute a long standing water pollution problem. Fish and other forms of aquatic life are killed when substantial amounts of acid wastes of these types are discharged directly into streams, lakes and ponds without prior treatment. Esthetic and recreational values are also damaged as often the resultant polluted water is discolored, has unpleasant odors, and is not suitable in general for swimming, boating, fishing and other recreational pursuits.

As a result of the foregoing, most localities have enacted strict water pollution statutes which are enforced very vigorously. One of the usual requirements is that the acid waste water be neutralized by treatment with a suitable alkaline substance prior to discharge. Examples of chemicals commonly added to acid waste water for neutralization purposes include hydrated lime, soda ash and particulate limestone.

The apparatus available heretofore for neutralizing acid waste water has not been entirely satisfactory for a number of reasons. As a general rule, the prior art apparatus required an outside power source and a full time operator which markedly increased the operating costs. Often the prior art apparatus was not capable of automatic or semi-automatic operation, and it was not possible to effectively control the amount of neutralizing chemical that was added per unit volume of treated water. Also, the apparatus was not self-contained in most instances, and it could not be moved easily from site to site for use on a permanent, semi-permanent or temporary basis.

As a result of the foregoing and other deficiencies and disadvantages, the art has long sought without success an entirely satisfactory apparatus for treating water with a chemical. However, apparatus that was entirely satisfactory in all respects was not available prior to the present invention.

THE SUMMARY OF THE INVENTION

The present invention overcomes the aforementioned and other disadvantages and deficiencies of the prior art. This is accomplished by providing the improved apparatus for treating water with a chemical which will be described more fully hereinafter.

In one presently preferred embodiment, the apparatus of the invention includes a water wheel and an axle therefor. The water wheel is mounted on the axle and has a plurality of circumferentially spaced buckets for receiving water to thereby cause the axle and the water wheel carried thereby to rotate. The axle is rotatably mounted whereby the axle and the water wheel are free to rotate at a speed which varies directly with the rate of feed of water to the buckets. A stream of water to be treated with the chemical is fed into the apparatus, and then subdivided into at least two and preferably three streams. The rate of flow of at least one of the subdivided streams is controlled and fed via a conduit to the buckets of the water wheel at the controlled rate. This causes the axle and the water wheel carried thereby to rotate at a speed which varies directly with the rate of flow of the water to the water wheel. A multi-speed gear box is provided having a rotatable input shaft and a rotatable output shaft. The axle of the water wheel is connected to the input shaft whereby the input shaft is rotated at a speed dependent upon the speed of rotation of the water wheel axle. The speed of rotation of the output shaft is varied by the gear box with respect to the speed of rotation of the input shaft. A container such as a hopper is provided for storing the chemical for use in treating the water. A metering device dispenses a controlled amount of the water treating chemical at a rate which is in response to the speed of rotation of the output shaft, and it is admixed with the water flowing in another of the subdivided streams. The resultant stream of water containing the water treating chemical is admixed with the remainder of the water fed into the said apparatus initially so that all of the water is ultimately treated with the chemical.

Reference may be had to the following detailed description of the invention and the accompanying illustrative drawings for a more thorough and complete understanding of the invention.

THE BRIEF DESCRIPTION OF THE ACCOMPANYING DRAWINGS

The invention will be described hereinafter in greater particularity with reference to the presently preferred embodiments thereof illustrated in the accompanying drawings, wherein.

The aforementioned figures of the drawings are referred to and discussed hereinafter in greater detail.

THE DETAILED DESCRIPTION OF THE INVENTION INCLUDING THE PRESENTLY PREFERRED VARIANTS AND EMBODIMENTS THEREOF

The accompanying drawings illustrate one presently preferred embodiment of the water treatment machine of the invention. The machine generally designated as 20 has a front and rear 21 and 22, and right and left sides 23 and 24, respectively. The machine 20 is slidably mounted on a pair of spaced longitudinally extending right and left runners 25 and 26 which are held in a generally parallel relationship by means of front, intermediate and rear cross members 27, 28 and 29, respectively. The supporting framework also includes spaced longitudinally extending right and left support members 30 and 31, respectively, which extend between cross members 28 and 29, and a transversely extending support member 32, which extends between the left support member 31 and the left runner 26.

The runners 25 and 26, the cross members 27, 28 and 29, and the support members 30, 31 and 32 are preferably I-beams as illustrated in the drawings, and are rigidly joined together at their intersections by welding or the like. The runners 25 and 26 have a substantially greater height than the cross members 27, 28 and 29 and the support members 30, 31 and 32, and they are all joined together with their upper surfaces being flush with respect to each other. This arrangement assures a substantial clearance between the supporting surface 33 upon which the lower surfaces of the runners 25 and 26 rest, and the lower surfaces of the cross members 27, 28 and 29 and the support members 30, 31 and 32. The terminal end portions of runners 25 and 26 are sloped upward and are provided with end plates 34 and 35, respectively, which form approximately a 30°-45° angle with the supporting surface 33. The terminal end portions of runners 25 and 26 are also provided with eyes 36 and 37, respectively, to which a draft vehicle such as a tractor may be attached at either end to thereby slide the machine 20 either forward or backward to a desired new location. Also, four cables leading from a crane or the like may be attached simultaneously to eyes 36 and 37, and the apparatus 20 may be lifted above the supporting surface 33 and thereafter transported to a desired new location.

The lower ends of right and left posts 40 and 41 are fixedly mounted on right runner 25 and right support member 30, respectively, and extend vertically upward therefrom to a common height. The water wheel 42 is supported on an axle 43. The right and left ends of axle 43 are rotatively mounted on the upper ends of right and left posts 40 and 41 in right and left bearings 44 and 45, respectively. The water wheel 42 is surrounded on its rear end, bottom, right side and left side by an enclosure 46 which includes rear wall 47, bottom 48, right side wall 49 and left side wall 50, respectively. The water wheel 42 is mounted sufficiently high to clear the bottom 48 during rotation and provide space for a water bypass 38 thereunder between partition wall 39 and bottom 48.

A water control box 51 is mounted on the upper portion of rear wall 47. The water control box 51 is provided with a large water inlet conduit 52, a large water outlet conduit 53 which is preferably the same size as conduit 52, a relatively small water outlet conduit 54, and a water outlet conduit 55 of intermediate size. The rate of flow of water in conduit 53 is controlled by valve 56, and the rate of flow of water in conduit 54 is controlled by valve 57. The water to be treated is passed to water control box 51 via water inlet 52, and the water is allowed to rise in the control box 51 at a rate controlled by valve 56. The water passing through conduit 53 is passed into water bypass 38 beneath water wheel 42, and thus it is allowed to by-pass water wheel 42. A portion of the water that is allowed to rise in water control box 51 is withdrawn via water outlet conduit 54 at a rate controlled by valve 57, and it is passed to the chemical mixing trough 58. The remainder of the water rising in water control box 51 is withdrawn via water outlet conduit 55 and is discharged onto the paddles 59 of the water wheel 42, thereby filling the buckets 60 with water.

Figure 1:
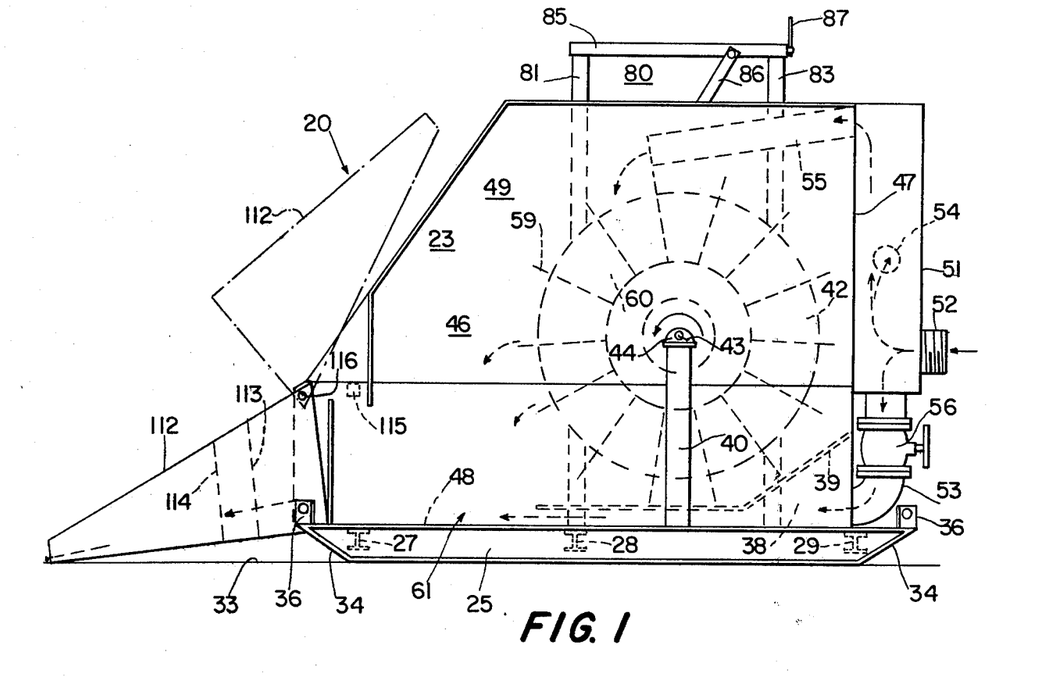
FIG. 1 is a right side view in elevation of the water treatment machine of the invention.
Figure 2:
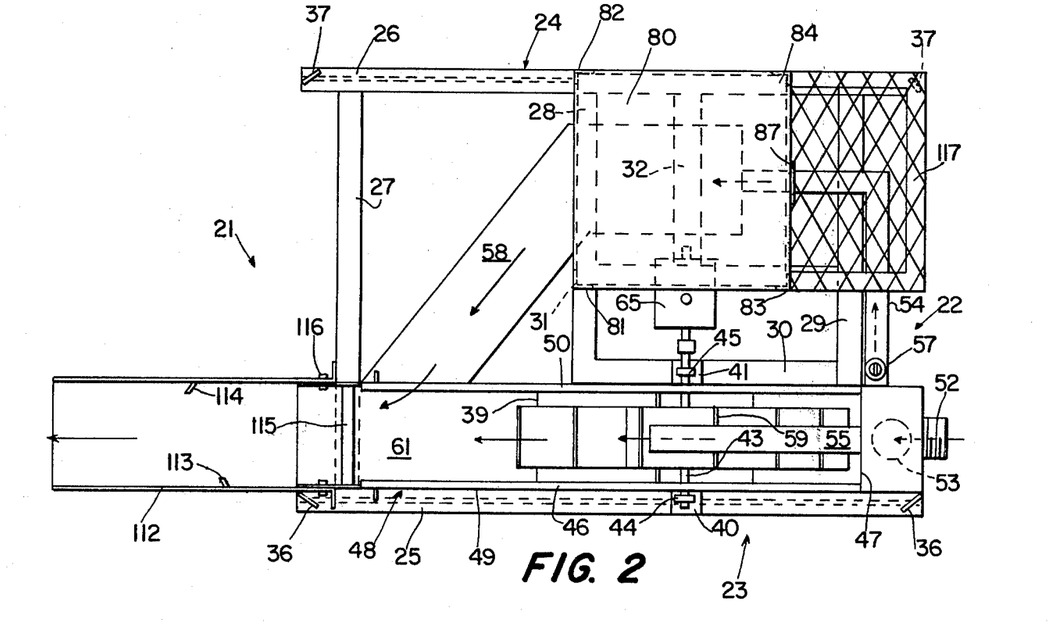
FIG. 2 is a top view of the water treatment machine of FIG. 1.
Figure 3:
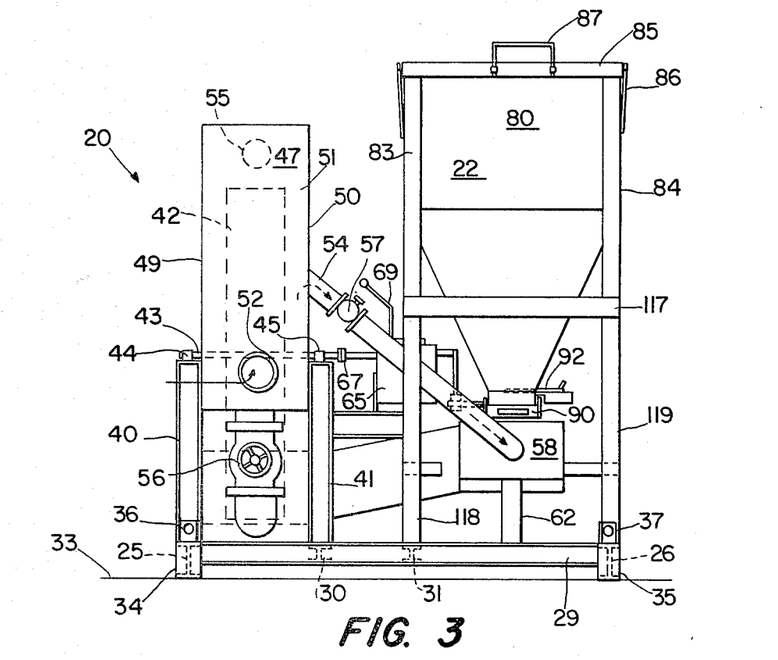
FIG. 3 is a rear view in elevation of the water treatment machine of FIG. 1.

As is well known in this art and is illustrated in FIGS. 1 and 2, water flowing from conduit 55 is discharged into buckets 60 after they have reached their maximum heighth and are beginning to descend, and when the paddles 59 are pointed at or above the horizon. With continued rotation of the water wheel 42 in the direction of the arrow, the water filled buckets 60 descend and the paddles 59 become pointed horizontally and eventually beneath the horizon thereby causing the water to flow from the descending buckets 60 into the large trough 61 where it is mixed with the water flowing through bypass 38. The thus emptied buckets 60 then begin to ascend with still continued rotation of the water wheel 42 until they once again reach their maximum heighth, and the cycle is repeated. This causes the water wheel 42 to turn and rotate axle 43 in the direction of the arrow, and thus the water wheel 42 provides power to operate the apparatus.

The multi-speed gear box 65 is shown schematically, and it is understood that the internal elements thereof are of a prior art construction and design. The input shaft 66 is securely connected to axle 43 by means of a flexible coupling 67, and it is driven in the same direction and at the same speed of rotation as the axle 43. The output shaft 68 in turn is driven at varying desired speeds, such as 1-4 or more times the speed of input shaft 66, as determined by the position of gear shift 69 on gear selector 70. The output shaft 68 has a plate 71 welded or otherwise fixedly mounted a short distance from its outer end. The cam arm 72 has an opening 73 adjacent one end of a size to receive output shaft 68, and a cam 74 is carried by the other end. The cam arm 72 and plate 71 are provided with a pair of aligned openings 75 and 76, respectively, arranged on opposite sides of output shaft 68. The cam arm 72 is fixedly mounted on output shaft 68 by inserting the outer end of output shaft 68 through opening 73, aligning the pairs of openings 75 and 76, the tightening nuts 78. Thus, the cam arm 72 and the cam 74 carried thereby are rotated at the same speed as output shaft 68.

Figures 13, 14:
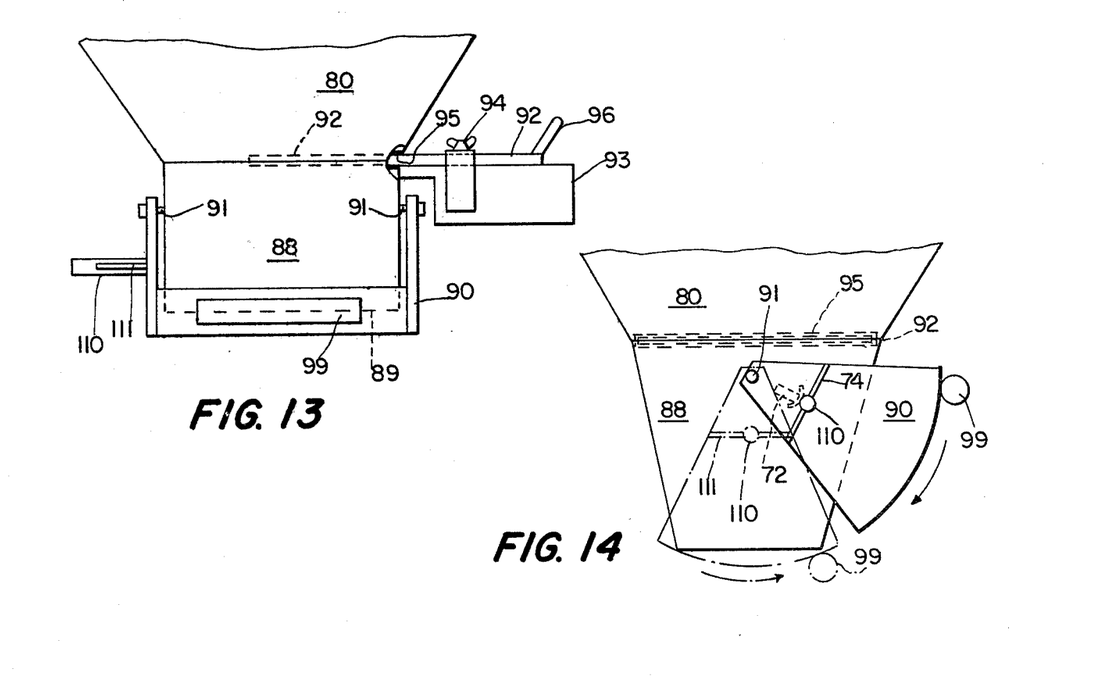
FIG. 13 is an enlarged fragmentary rear view in elevation of the lower portion of the hopper of the water treatment machine of FIG. 1, which further illustrates the hopper door, the metering gate and the support therefor.
FIG. 14 is a right side view of FIG. 13.

A rectangular open top hopper 80 for storing the particulate water treating chemical is supported at its corners by four posts 81, 82, 83 and 84, and a removable water tight top 85 therefor is provided which is mounted on arms 86. The top 85 may be lifted up by handle 87 to provide access to the hopper interior for replenishing the water treating chemical as needed. The lower portion of hopper 80 is sloped inward and terminates in an extension 88 of sharply reduced cross-sectional area. The extension 88 has an opening 89 in its lower end and is provided with a weighted hopper door 90. The hopper door 90 is mounted on pins 91 beneath the opening 89 for swinging movement from the normally closed position shown in FIG. 13 and in phantom line in FIG. 14 to the open position shown in solid line in FIG. 14. When in the normally closed position, the hopper door 90 effectively closes off the opening 89 and prevents the particulate chemical from flowing from hopper 80. However, when the hopper door 90 is swung to the open position of FIG. 14, the particulate chemical is free to flow through opening 89 at a rate controlled by metering gate 92. As is best seen in FIG. 14 in solid line, the weight 99 is raised substantially above its normal position shown in phantom line when the hopper door is pushed by cam 74 to the open position. Thus, the weight 99 causes the hopper door 90 to return rapidly to the normally closed position when it is no longer pushed by cam 74, thereby preventing unwanted additional chemical from being dispensed.

Figure 9:
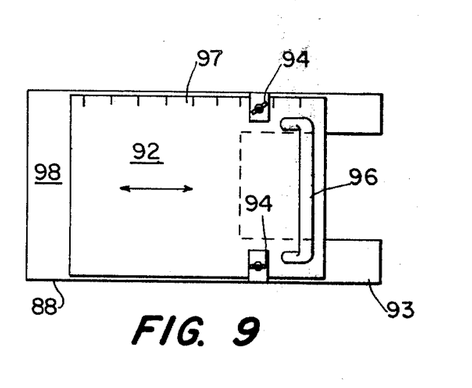
FIG. 9 is an enlarged top view of the metering gate and the support therefor taken along the line 9—9 of FIG. 10.
Figure 10:
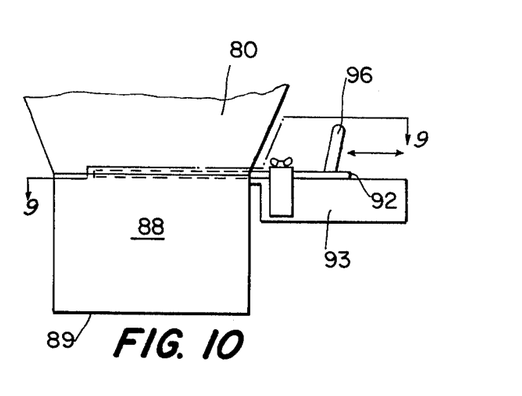
FIG. 10 is an enlarged fragmentary rear view in elevation of the hopper, metering gate and the support therefor, with the hopper door being omitted for purposes of clarity, which further illustrates the same in greater detail.
Figure 11:
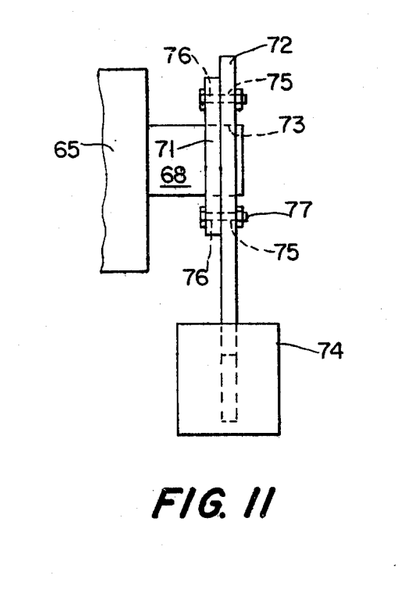
FIG. 11 is an enlarged fragmentary rear view in elevation of the cam arm and cooperating apparatus of the water treatment machine of FIG. 1, which further illustrates the same in greater detail.
Figure 12:
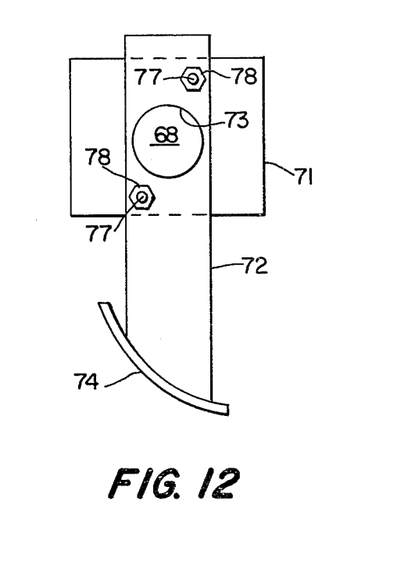
FIG. 12 is a left side view of FIG. 11.

As is best seen in FIGS. 9, 10 and 13, the metering gate 92 is slidably mounted on support 93 and is retained in a desired position by set screws 94. The width of metering gate 92 closely conforms with the internal width of hopper extension 88 at opening 95, and its length is substantially greater than the internal length of hopper extension 88 at opening 95. Thus, when the normally tightened set screws 94 are loosened, the metering gate 92 may be inserted through opening 95 and moved back and forth within the interior of hopper extension 88 by pushing and/or pulling on handle 96 until the desired setting on scale 97 is obtained. The set screws 94 are then re-tightened to retain the metering gate 92 at the desired setting. The resultant cross-sectional area 98 which is not covered by metering gate 92 will determine the rate of flow of the particulate chemical from hopper 80 and in turn from opening 89. This rate of flow varies directly with the cross-sectional area 98, and thus the cross-sectional area 98 may be increased or decreased by adjustment of metering gate 92 to arrive at a desired level of water treatment with the chemical.

Figure 7:
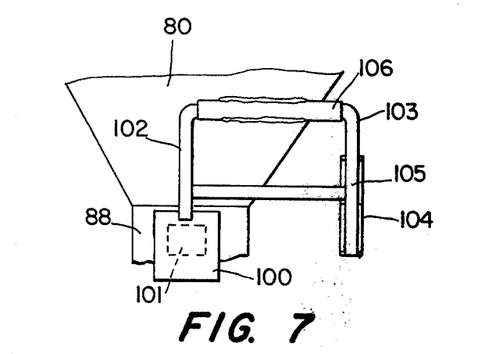
FIG. 7 is an enlarged fragmentary rear view in elevation of the hopper and weighted hammer of the water treatment machine of FIG. 1, which further illustrates the same in greater detail.
Figure 8:
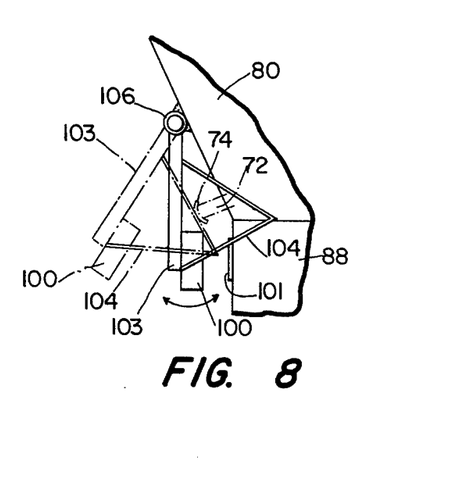
FIG. 8 is an enlarged fragmentary right side view in elevation of the hopper, weighted hammer and cam arm of the water treatment machine of FIG. 1, which further illustrates the same in greater detail.

As is best seen in FIGS. 7 and 8, a hammer 100 is carried by the lower portion of hopper 80 for sharply striking the plate 101 on the hopper extension 88 and thereby preventing the particulate chemical from caking or building up within the interior or otherwise not flowing freely from opening 89. The hammer 100 is mounted on the end of one leg 102 of an inverted generally U-shaped member 103, and a normally horizontal generally V-shaped cam surface 104 is mounted on the lower portion of the other leg 105. The center portion of U-shaped member 103 is rotatably mounted within the sleeve 106, which in turn is horizontally mounted by welding to hopper 80. This arrangement allows the U-shaped member 103 and the hammer 100 and V-shaped member 104 carried thereby to be pushed by cam 74 from the normal position shown in solid line in FIG. 8 to the position shown in phantom line. When the V-shaped member is no longer pushed by cam 74, the heavy hammer 100 is free to swing downward from the elevated position shown in phantom line. The resulting momentum carries hammer 100 past the normal position and plate 101 is sharply struck thereby before it returns to the normal position.

A horizontally extending rod 110 provided with braces 111 is mounted on the side of hopper door 90. The normal position of rod 110, as shown in solid line in FIG. 13 and in phantom line in FIG. 14, is located in the path of cam 74 as it is rotated by cam arm 72 at a rotation rate determined by output shaft 68. Thus, once each revolution of output shaft 68, the hopper door 90 is pushed by the action of cam 74 on rod 110 from the normally closed position shown in phantom line in FIG. 14 to the elevated open position shown in solid line. When rod 110 is no longer pushed by cam 74, the hopper door 90 immediately returns to the normally closed position due to the downward pull thereon of the elevated weight 99. Similarly, the normal position of U-shaped cam surface 104 shown in solid line in FIG. 8 is also located in the path of cam 74. Thus, once each revolution of output shaft 68, the hammer 100 is pushed by the action of cam 74 on U-shaped cam surface 104 from the normal position shown in solid line in FIG. 8 to the elevated position shown in phantom line. When U-shaped cam surface 104 is no longer pushed by cam 74, the elevated hammer 100 swings downward and sharply strikes plate 101.

The above described apparatus dispenses a controlled incremental addition of the water treating chemical through opening 89 for each revolution of the output shaft 68. The additions drop from opening 89 into the trough 58 by gravity and are admixed with the water fed thereto by conduit 54. The admixture of the water and chemical passes from trough 58 into trough 61 where it joins the untreated water fed thereto via conduits 53 and 55. The full flow of water in trough 61 is then discharged through trough 112 where it is agitated by the baffles 113 and 114 and thoroughly admixed. This results in all of the water fed to machine 20 via inlet conduit 52 being treated with the chemical prior to discharge.

Figure 4:
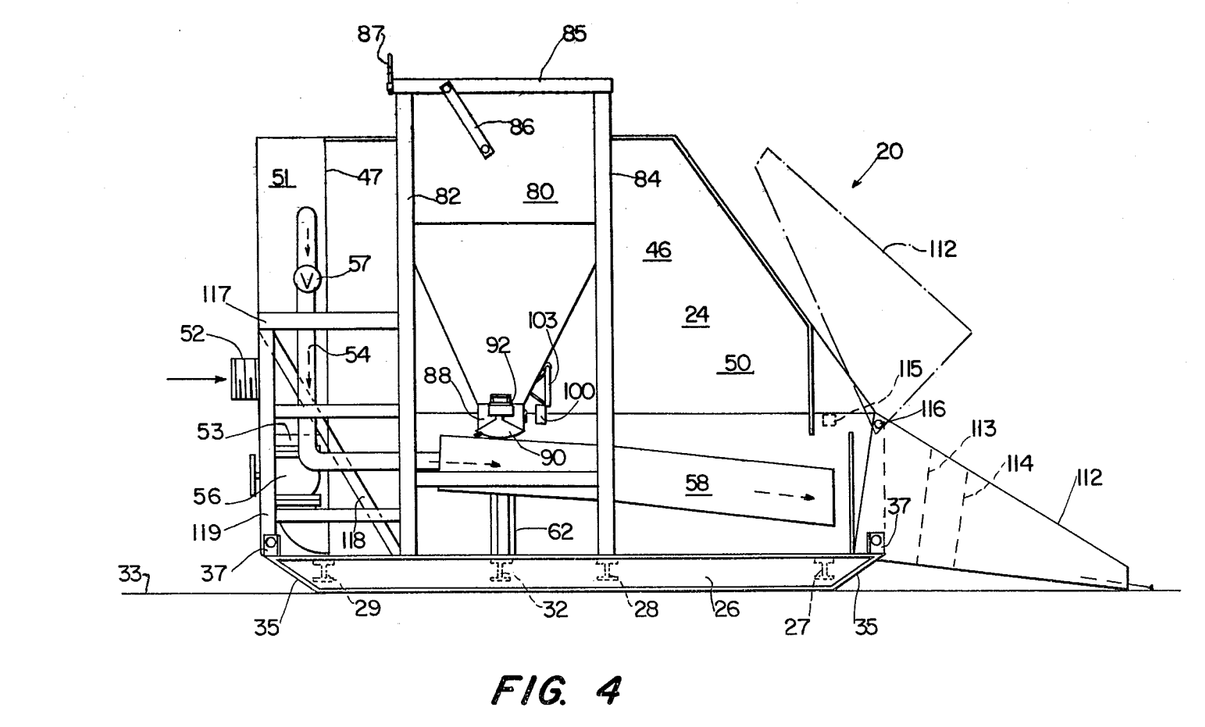
FIG. 4 is a left side view in elevation of the water treatment machine of FIG. 1.
Figure 5:
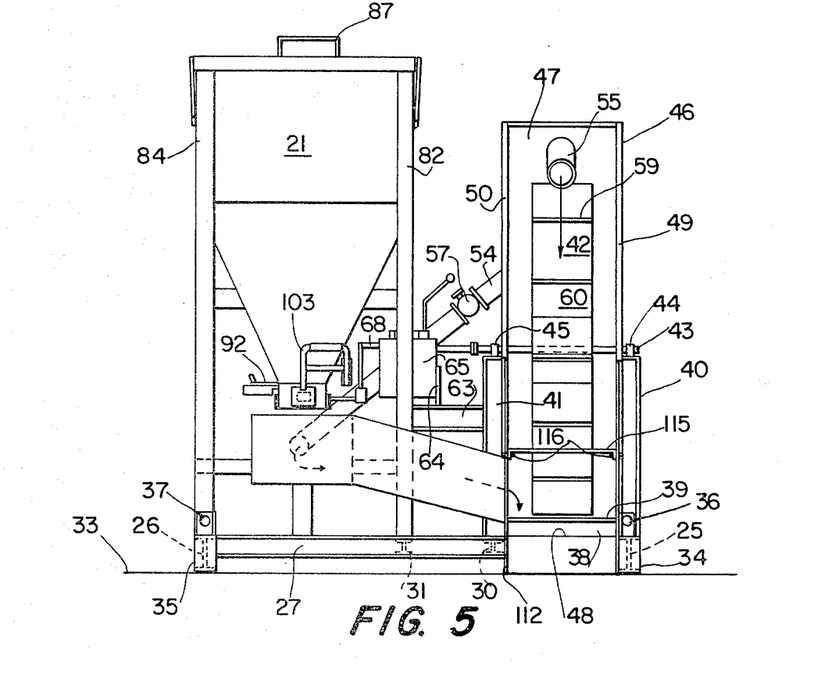
FIG. 5 is a front view in elevation of the water treatment machine of FIG. 1.
Figure 6:
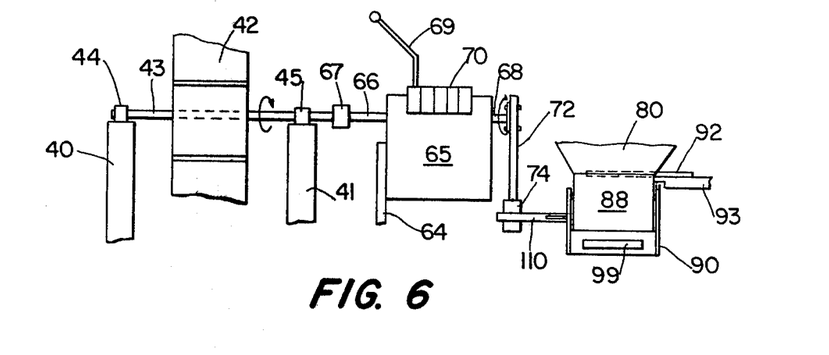
FIG. 6 is an enlarged fragmentary rear view in elevation of the power train of the water treatment machine of FIG. 1, with the weighted hammer being omitted for purposes of clarity, which further illustrates the component elements thereof in greater detail.

The trough 61 is sufficiently smaller than trough 112 to allow the outer end thereof to be inserted into the inner end of trough 112 with a clearance between the two bottom surfaces. The troughs 61 and 112 are swingably joined together near the tops of each of their respective adjacent sides by means of a pair of hinge pins 116. The resultant spaced hinge joints allow the trough 112 to be raised from the operating position shown in solid line to the transporting position shown in phantom line, and vice versa. Upon lowering the trough 112 to the operating position, the inner end is angularly disposed in an upward direction and thus the inner end thereof contacts the bottom of trough 61 and forms a relatively water tight seal between the troughs 61 and 112. When it is desired to move the water treating machine 20 to a different site, the outer end of trough 112 may be raised and the trough 112 folded back into the front of machine 20 as is shown in phantom line in FIGS. 1 and 4. A brace 115 is provided for strengthening the ends of trough 61.

The hopper 80 may be provided with a platform 117 supported by support members 83, 84, 118 and 119. The platform 117 is at a height permitting convenient replenishing of the water treating chemical in hopper 80.

The major components of the water treating machine 20 are permanently mounted on the supporting framework whereby it is a self-contained water treating unit. The weight is approximately balanced both longitudinally and transversely. For example, the posts 40 and 41 which support water wheel 42 rest on runner 25 and member 30, respectively, the gear box 65 is supported by cross member 63 which carries upright strap 64, the trough 58 is supported by post 62 which rests on member 32, and the hopper 80 is supported by posts 81-84 which rest on members 26, 28 and 31. The approximate transverse center line of each of these major components is on a line taken longitudinally through the axle 43, shafts 66 and 68 and support member 32. Also, these major components are spaced both longitudinally and transversely on the framework with respect to eyes 36 and 37 whereby the weight is approximately balanced when the machine 20 is lifted by lines attached to eyes 36 and 37. This is an important feature as it assures longitudinal and transverse stability when the machine 20 is lifted and moved to a different site with a crane or the like. The machine 20 also may be pulled either forward or backward on the runners 25 and 26 by attaching lines from a towing vehicle to eyes 36 and 37 at one end thereof. The flexible coupling 67 allows relative movement between the axle 43 and shaft 66 when the machine 20 is being moved and thereby prevents damage to these members as well as gear box 65 and water wheel 42.

The machine 20 is especially useful in neutralizing acid mine run off water. However, it is understood that numerous other types of acid waste streams may be treated. The acid waste streams may be derived, for example, from coal mining operations and/or the treatment of the mined coal with aqueous media, or from industrial processes which produce waste acidic solutions such as electroplating and the pickling of steel. It is also possible to treat strongly alkaline waste streams with, for example, a suitable chemical having an acidic reaction. Contaminated or polluted acidic, neutral or basic waste streams also may be treated with a chemical selected to remove or render harmless the specific contaminants and/or pollutants that are present.

The chemical that is stored in hopper 80 and used in treating the water may be selected in accordance with prior art practice. For example, acid mine run off water is often treated with hydrated lime, light soda ash, or other chemicals having a basic reaction. Waste alkaline streams may be treated with an acid salt or other chemical having an acidic reaction. The chemical is preferably in the form of free flowing particles so as to avoid caking and other problems in hopper 80. For best results, the chemical also should be soluble or partially soluble in water, or capable of being dispersed in water.

The water treatment machine 20 is self-contained and is capable of semi-automatic or automatic operation. It does not require a full-time operator under normal operating conditions, and it may be moved from site to site for use on a permanent, semi-permanent or temporary basis. An outside power supply is not required as the water wheel 42 provides more than sufficient power to operate the apparatus. It is also possible to carefully control the amount of chemical that is used to treat a given volume of water, the amount of chemical that is present in a given incremental addition, and/or the total amount of chemical that is dispensed in a given period of time. Thus, the water treatment machine 20 is very versatile in operation.

The foregoing detailed description of the accompanying drawings are for purposes of illustration only, and are not intended as being limiting to the spirit or scope of the appended claims.

I claim:

1. An apparatus for treating water with a chemical comprising a water wheel and an axle therefor, the water wheel being mounted on the axle and including a plurality of circumferentially spaced buckets for receiving water to thereby cause the axle and the water wheel carried thereby to rotate, means for rotatably mounting the axle whereby the axle and the water wheel carried thereby are free to rotate at a speed which varies directly with the rate of feed of water to the said buckets, first conduit means for feeding a first stream of water to be treated with the chemical into the said apparatus, the first conduit means including second conduit means and water flow rate control means for dividing the said first stream of water to be treated into at least second and third streams, the rate of flow of at least the said second stream being controlled by the flow rate control means, the said second conduit means including third conduit means for feeding the said second stream of water to the buckets of the water wheel at the said rate controlled by the flow rate control means to thereby cause the axle and the water wheel carried thereby to rotate at a speed which varies directly with the rate of flow of water in the second stream, multi-speed gear means having a rotatable iput shaft and a rotatable output shaft, connecting means for connecting the axle of the water wheel to the input shaft whereby the input shaft is rotated at a speed dependent upon the speed of rotation of the water wheel axle, the gear means including means for varying the speed of rotation of the output shaft with respect to the speed of rotation of the input shaft, container means for storing the chemical for use in treating the water, metering means for dispensing a controlled amount of the said water treating chemical in the container means at a rate in response to the speed of rotation of the output shaft and for admixing the same with the water flowing in the said third stream, and admixing means for admixing the said third stream of water containing the water treating chemical with the remainder of the first stream of water fed into the said apparatus via the first conduit means.

2. The apparatus of claim 1 wherein the said apparatus is mounted on a unitary supporting framework which rests upon a supporting surface, and the said apparatus is a self-contained water treating unit which may be moved from site to site.

3. The apparatus of claim 2 wherein the said supporting framework includes spaced substantially parallel longitudinally extending support members, and only the said longitudinally extending support members of the supporting framework rest upon the said supporting surface whereby they serve as runners on which the apparatus may be moved from site to site by a sliding action as a self-contained water treating unit.

4. The apparatus of claim 2 wherein the said supporting framework is provided with a plurality of spaced means for receiving attaching means leading from a lifting means, and the said apparatus is mounted on the said supporting framework and the said plurality of means for receiving the attaching means are positioned on the said framework whereby the weight is approximately balanced and the said apparatus may be lifted by the said lifting means and transported to a different site as a self-contained water treating unit.

5. The apparatus of claim 4 wherein the said supporting framework includes spaced substantially parallel longitudinally extending support members, only the said longitudinally extending support members of the support framework rest upon the said supporting surface whereby they serve as runners on which the apparatus may be moved from site to site by a sliding action as a self-contained water treating unit, and the said plurality of spaced means for receiving the attaching means are positioned on the said longitudinally extending support members.

6. The apparatus of claim 1 wherein the said second conduit means and water flow rate control means also includes means for dividing the said first stream of water into a fourth stream of water and for controlling the rate of flow of the said third and fourth streams, and the said admixing means includes means for admixing the said third stream of water with the said second and fourth streams.

7. The apparatus of claim 1 wherein the said means for connecting the axle of the water wheel to the input shaft is flexible whereby relative movement is permitted between the axle and the water wheel carried thereby and the multi-speed gear means and the input shaft carried thereby.

8. The apparatus of claim 1 wherein the said multi-speed gear means includes gear means for varying the speed of rotation of the output shaft between one and four times the speed of rotation of the input shaft.

9. The apparatus of claim 1 wherein the cam arm means including a cam arm and a cam is mounted on the output shaft, the cam arm being mounted on the output shaft by mounting means therefor at a point adjacent one end thereof and carrying the cam at a point adjacent the other end thereof, the cam arm means being mounted whereby the cam arm and the cam carried thereby are rotated at the same speed as the output shaft, and the said metering means includes means whereby it is actuated by the cam at least once per revolution thereof and is caused to dispense a controlled amount of the water treating chemical.

10. The apparatus of claim 1 wheein the said metering means includes means for withdrawing increments of the water treating chemical from the container means, means for varying the quantity of the chemical in each of the said increments, and means whereby the frequency with which the said increments are withdrawn is determined by the speed of rotation of the output shaft.

11. The apparatus of claim 10 wherein the said multi-speed gear means includes gear means for varying the speed of rotation of the output shaft between one and four times the speed of rotation of the input shaft.

12. The apparatus of claim 10 wherein a cam arm means including a cam arm and a cam is mounted on the output shaft, the cam arm being mounted on the output shaft by mounting means therefor at a point adjacent one end thereof and carrying the cam at a point adjacent the other end thereof, the cam arm means being mounted whereby the cam arm and the cam carried thereby are rotated at the same speed as the output shaft, and the said metering means includes means whereby it is actuated by the cam at least once per revolution thereof and is caused to dispense a controlled amount of the water treating chemical.

13. The apparatus of claim 12 wherein the said multi-speed gear means includes gear means for varying the speed of rotation of the output shaft between one and four times the speed of rotation of the input shaft.

14. The apparatus of claim 13 wherein the said second conduit means and water flow rate control means also includes means for dividing the said first stream of water into a fourth stream and for controlling the rate of flow of the said third and fourth streams, and the said admixing means includes means for admixing the said third stream of water with the said second and fourth streams.

15. The apparatus of claim 1 wherein the water treating chemical is in particulate form, and the said container means includes hopper means for storing the water treating chemical in its particulate form.

16. The apparatus of claim 15 wherein the hopper is sloped inward on its lower end and includes a lower extension of reduced cross-sectional area which has an opening in the bottom thereof whereby the particulate water treating chemical may be withdrawn through the said opening by gravity, and a hammer means is provided for sharply striking the lower end of the hopper to thereby assure that the said lower extension thereof has particulate water treating chemical available therein for withdrawing through the opening.

17. The apparatus of claim 16 wherein a cam arm means including a cam arm and a cam is mounted on the output shaft, the cam arm being mounted on the output shaft by mounting means therefor at a point adjacent one end thereof and carrying the cam at a point adjacent the other end thereof, the cam arms means being mounted whereby the cam arm and the cam carried thereby are rotated at the same speed as the output shaft, and the hammer means including means whereby it is actuated by the cam at least once per revolution thereof and is caused to strike the lower portion of the hopper.

18. The apparatus of claim 15 wherein the hopper has an opening in the bottom thereof whereby the particulate water treating chemical may be withdrawn through the said opening by gravity, the said metering means includes a hopper door, mounting means for mounting the hopper door for swinging movement beneath the said opening in the bottom of the hopper extension, the hopper door being mounted whereby it is normally in a closed position directly beneath the said opening whereby it prevents the particulate water treating chemical from flowing therefrom, the hopper door being swingable from its said normally closed position to an open position which is to one side of the said opening whereby when the hopper door is in the open position the particulate water treating chemical is free to flow through the said opening, and the said metering means also includes sliding gate means for varying the effective cross-sectional area of the said opening and thereby controlling the rate of flow of the particulate water treating chemical through the said opening.

19. The apparatus of claim 18 wherein the hopper is sloped inward on its lower end and includes a lower extension of reduced cross-sectional area which has the said opening in the bottom thereof, and a hammer means is provided for sharply striking the lower end of the hopper to thereby assure that the said lower extension thereof has particulate water treating chemical available therein for withdrawing through the said opening.

20. The apparatus of claim 19 wherein a cam arm means including a cam arm and a cam is mounted on the output shaft, the cam arm being mounted on the output shaft by mounting means therefor at a point adjacent one end thereof and carrying the cam at a point adjacent the other end thereof, the cam arm means being mounted whereby the cam arm and the cam carried thereby are rotated at the same speed as the output shaft, the hammer means including means whereby it is actuated by the cam at least once per revolution thereof and is caused to strike the lower portion of the hopper, and the hopper door including means whereby it is contacted by the cam at least once per revolution thereof and the hopper door is moved from the normally closed position to the open position and the particulate water treating chemical is free to flow through the said opening.

21. The apparatus of claim 20 wherein the hopper door includes a weight means which is raised from its normal position to an elevated position when the hopper door is moved from the normally closed position to the open position whereby the hopper door is caused to return promptly to the normally closed position when it is no longer contacted by the cam.

* * * * *